United States Patent [19]

Zhang et al.

[11] Patent Number: 5,197,810
[45] Date of Patent: Mar. 30, 1993

[54] METHOD AND SYSTEM FOR INPUTTING SIMPLIFIED FORM AND/OR ORIGINAL COMPLEX FORM OF CHINESE CHARACTER

[75] Inventors: Daozheng Zhang; Nian R. Liang, both of 14 Dongtaiping Street, Xicheng District, Beijing, China

[73] Assignees: Daozheng Zhang; Nian R. Liang; Beijing Stone Office Equipment Technology Co. Ltd., all of Beijing, China

[21] Appl. No.: 540,491

[22] Filed: Jun. 19, 1990

[30] Foreign Application Priority Data

Jun. 19, 1989 [CN] China ................. 89103862.0

[51] Int. Cl.$^5$ ............................. B41J 5/00
[52] U.S. Cl. ........................ 400/110; 400/484
[58] Field of Search ............ 400/110, 484, 109; 340/28; 364/419

[56] References Cited

U.S. PATENT DOCUMENTS

| | | | |
|---|---|---|---|
| 4,379,288 | 4/1983 | Leung et al. | 400/110 |
| 4,505,602 | 3/1985 | Wong | 400/110 |
| 4,559,615 | 12/1985 | Goo et al. | 400/110 |
| 4,684,926 | 8/1987 | Yong-Min | 400/109 |
| 4,954,955 | 9/1990 | Chiu | 400/110 |
| 5,006,001 | 4/1991 | Vulcano | 400/486 |

*Primary Examiner*—Edgar S. Burr
*Assistant Examiner*—Ren Yan
*Attorney, Agent, or Firm*—Ladas & Parry

[57] ABSTRACT

A method and a system for inputting both simplified form and original complex form Chinese character, comprises two dominent and highly efficient inputting methods and a plurality of auxiliary ones wherein 187 radicals have been selected. These radicals then are defined onto 25 keys in a standard English keyboard. The rules to be remembered by the typist is simplified greatly, and therefore, the Chinese character inputting speed is improved significiently.

8 Claims, 18 Drawing Sheets

| | 0 | 1 | 2 | 3 | 4 | 5 | 6 | 7 | 8 | 9 |
|---|---|---|---|---|---|---|---|---|---|---|
| 0 | | QBWY XRCY 弧₃ 弓广厶、 55325441 | HAMt HHAMtn 虎₃ 广七乙 21152551 | KHAM KKHAM 唬 口广七几 23211525 | BYTn RYTn 护₃ 扌、尸丿 32415131 | GQGg GQGg 互₃ 一勹一 11551111 | IYTn IYTn 沪 氵、尸丿 43415131 | YTn YYNt 户₃ 、尸丿 415131 | ACQt AWXn 花₃ 艹亻匕乙 15345551 | KCQQ KKQQ 哗₃ 口匕匕十 23345555 |
| 1 | CQQh WXXh 华 亻匕十 34555521 | XNMV QTME 猾₃ 犭呗月 35312533 | IMVg IME g 滑₃ 氵呗月一 43253311 | GLRh GLBh 画₃ 一田凵丨 11245221 | AJh AJh 划₃ 戈刂 152241 | CQt WXn 化 亻匕 345551 | YNSg YTSg 话 讠丿古 41311411 | SBXW SRQC 槐₃ 木自儿厶 14323554 | NMKg TMK g 徊 口口一 31252311 | HGLy HGLy 怀 忄一小、 21112441 |
| 2 | ICYg IWYg 淮 氵亻圭一 43344111 | FGLy FGLy 坏₃ 土一小、 12112441 | WXCy CQWy 欢₃ 又勹人、 54353441 | FGGL FGGL 环₃ 干一一小 12111124 | SGJG SGJG 桓₃ 木一日一 14112211 | GLPy GLPy 还₂ 一小辶 11244541 | QVGW XEGC 缓₃ 纟爰 55331154 | BXRA RQBA 换 扌勹大 32355215 | KKHT KKHN 患 口口一心 23232151 | KXRA KQBA 唤 口勹大 23355215 |
| 3 | UXRA UQBA 痪 疒勹大 42355215 | OAVy OAEy 豢 ツ大豕 44153341 | OXRA OQBA 焕 火勹大 44355215 | IXRA IQBA 涣 氵勹大 43355215 | PGTH PGNH 宦 宀一乙丨 45115121 | Qtt XNn 幻₃ 幺乙 555151 | AITX AINQ 荒₃ 艹亡川 15435135 | HAIX HAIQ 慌 忄亡川 21154335 | AMCy AMWy 黄₃ 艹由八 15253441 | DAMC DAMW 磺 石艹由八 13152534 |
| 4 | JBFG JRFG 蝗₂ 虫白千一 22322211 | NAMC TAMW 簧 竹艹由八 31152534 | BFGg RFG g 皇₃ 自白千一 32121111 | MBFG MRFG 凰₃ 几白千一 25321211 | HBFG HRFG 惶 忄白千一 21321211 | OBFG ORFG 煌 火白千一 44321211 | JIXt JIQn 晃₂ 日兴儿乙 22433551 | RHJX BHJQ 幌 巾日兴 52212351 | HIXt HIQn 恍 忄兴儿 21433551 | YAIX YAIQ 谎 讠亡川 41154335 |
| 5 | DOy DOy 灰₂ 厂火、 134441 | BPLh BPLh 挥₃ 扌一圭、 32452421 | IXPL IQPL 辉₃ 兴儿一圭 43354524 | NMGN TMGT 徽₃ 彳山一攵 31251131 | HDOy HDOy 恢₃ 忄厂火、 21144411 | JMKg JMK g 蛔₂ 虫口口一 22252311 | MKg MKg 回₂ 口口一 2231 | EAMC VAMC 毁₃ 自工几又 53562554 | HNQU HTXU 海₃ 氵每 21315542 | DHDT DHDN 慧 三丰三心 13211351 |
| 6 | QAh XAh 卉 十廾 551521 | GJHT GJHN 惠₃ 一日丨心 11222151 | JNQU JTXU 晦₃ 日每 22315542 | MDVg MDEg 贿₃ 四十月一 25133311 | LMXy LLMQy 秽₃ 禾山夕、 24253541 | CFWy WFCy 会₃ 人二厶 34125441 | OCFW OWFC 烩₃ 火人二厶 44341254 | IGTt IGNn 汇 氵一乙 43115151 | YFTH YFNH 讳₃ 讠二丨 41125121 | YNQU YTXU 海 氵每 41315542 |
| 7 | QCFW XWFC 绘 纟人二厶 55341254 | APLh APLh 荤 艹一车丨 15452421 | XAJg QAJ g 昏₃ 氏七日一 35152211 | EXAJ VQAJ 婚₂ 女氏七日 53351522 | FWBW FCRC 魂 二厶白厶 12543254 | IPLh IPLh 浑 氵一车 43452421 | IJQQ IJXX 混₃ 氵日匕匕 43325555 | PDHK PDHK 豁 宀丰口 45132123 | INSg ITS g 活 氵丿古 43311411 | COy COy 伙 亻火、 344441 |
| 8 | UCy UWy 火₂ 、火 423441 | AXND AQTD 获 艹犭大 15353113 | AKGg AKG g 或₂ 戈口一 15231111 | AKGT AKGN 惑 戈口一心 15231151 | FCYg FWYg 霍 雨亻圭一 12344111 | CQMy WXMy 货₃ 亻匕贝 34552541 | PYKC PYKW 祸 礻口人 45412334 | FMh FMh 击₂ 二山 122521 | FVYY FEYY 圾 土乃、 12334141 | ADCF ADWF 基 艹三八土 15133412 |
| 9 | SMt SMn 机₃ 木几乙 142551 | LASK LASK 畸 田大丁口 24151423 | LDTJ LDNJ 稽₃ 禾乙日 24233122 | LKCy LKWy 积₃ 禾口八 24233441 | NADC TADW 箕₃ 竹三八 31151334 | | | | | |

| Key | Value |
|---|---|
| Q | 3.1690 |
| W | 3.2669 |
| E | 3.1914 |
| R | 4.6048 |
| T | 5.0064 |
| Y | 6.4620 |
| U | 3.5122 |
| I | 2.7737 |
| O | 2.7494 |
| P | 2.8536 |
| A | 3.1043 |
| S | 3.2139 |
| D | 3.8959 |
| F | 5.2852 |
| G | 8.1799 |
| H | 5.3155 |
| J | 4.7845 |
| K | 3.8770 |
| L | 2.6811 |
| Z | — |
| X | 2.1303 |
| C | 2.4942 |
| V | 2.2570 |
| B | 3.6991 |
| N | 5.5491 |
| M | 3.2957 |

FIG. 14

| Key | Value |
|---|---|
| Q | 2.9598 |
| W | 2.9366 |
| E | 2.0141 |
| R | 3.3925 |
| T | 5.0001 |
| Y | 7.4468 |
| U | 3.5413 |
| I | 3.9450 |
| O | 2.1841 |
| P | 2.4453 |
| A | 2.4131 |
| S | 2.0907 |
| D | 3.9772 |
| F | 4.6505 |
| G | 8.6103 |
| H | 6.9444 |
| J | 4.7344 |
| K | 3.4363 |
| L | 3.7751 |
| Z | — |
| X | 2.8036 |
| C | 2.5682 |
| V | 3.2864 |
| B | 3.1619 |
| N | 6.4310 |
| M | 2.8754 |

FIG. 21

| F1 | F2 | F3 | F4 | F5 | F6 | F7 | F8 | F9 | F10 |
|---|---|---|---|---|---|---|---|---|---|
| HELP | 字根 | 笔画 | 拼音 | 电报 | 区位 | 国标 | 表格 | 标点 | ASC |

FIG. 22

| F1 | F2 | F3 | F4 | F5 | F6 | F7 | F8 | F9 | F10 |
|---|---|---|---|---|---|---|---|---|---|
| 行/屏 | 列/行 | 全高/半高 | 变色 | 英字符/汉字 | 英图形/汉字 | 光标有/无 | 全角/半角 | 立即透词 | 打印机设置 |

FIG. 23

| F1 | F2 | F3 | F4 | F5 | F6 | F7 | F8 | F9 | F10 |
|---|---|---|---|---|---|---|---|---|---|
| 字根拼音 | 字根笔画 | 笔画拼音 | 繁/简 | 实线/双实线 | Q/X | 强化联想 | 自动 | 编码返回 | 字根返回 |

METHOD AND SYSTEM FOR INPUTTING
SIMPLIFIED FORM AND/OR ORIGINAL
COMPLEX FORM OF CHINESE CHARACTER

BACKGROUND OF THE INVENTION

The present invention relates to a method and a system used in Chinese character information processing apparatus like computer, typewriter, and the like for inputting Chinese character.

Along with the rapid popularization of electronic computers, especially microcomputers in countries where Chinese characters are used, numerous Chinese character inputting methods and systems for computers have been developed. Up to date, the existing methods and systems still have the following problems:

Generally, the existing keyboard Chinese character inputting methods take into consideration of every individual encoding scheme of Chinese character only, without an overall consideration of the inputting method to facilitate different levels of people with multiple schemes. The existing schemes are either easy to learn but inefficient or hard to learn but efficient. In the relationship between the encoding scheme and inputting system, only one code correspondence table is implemented; no other more convenient auxiliary inputting methods and intelligent software processing have been adapted for the schemes to make it become a practical inputting method while hardware devices and internal code systems have been usually taken into consideration from the view of inputting systems. Therefore the encoding scheme and inputting system fail to cooperate closely. Therefore, higher practical level cannot be achieved and various user's requirements cannot be satisfied widely.

The existing Chinese character inputting systems usually process simplified form or original complex form Chinese characters separately rather than simultaneously.

The majority of the existing Chinese character encoding schemes are realized manually, without being analyzed and studied quantitatively by the computers and an optional design is hardly achieved.

The cross recognition of the last stroke and character pattern of a character in the WBZX Chinese characters Encoding Scheme (Universal System of Encoding Chinese characters and its Keyboard, U.S. Pat. No. 4,684,926) prevalent in China recently has been being a hard nut to crack by the user because the concepts of character patterns, radicals forming a character as well as the names of keys have increased the information to be remembered. These problems have not been solved up to now.

SUMMARY OF THE PRESENT INVENTION

The present invention is aimed to solve the above mentioned problems.

The present invention includes a series of various Chinese character inputting methods from simple and easy-to-learn ones to quick and efficient ones as well as many simple and convenient auxiliary inputting methods. In these methods, there are ones according to the form of characters, and ones according to the pronounciation of characters; they can be used separately or in combination; they can be used to process simplified form Chinese characters as well as original complex form Chinese characters. Furthermore, they are operative to process simplified form and original complex form Chinese characters simultaneously. In addition, the simplified form and original complex form Chinese characters can be converted to each other.

The present invention is not an individual Chinese character encoding scheme or an arbitrary combination of several irrelevant encoding schemes, but a series of selected optional Chinese character encoding schemes from simple and easy methods to quick and efficient methods developed after a long phase of experiments and combined carefully with various auxiliary methods and intelligent software processing in order to make it appear to be a practical Chinese character inputting method. And the present invention combines the Chinese character inputting method and inputting system into a closely relevant organic whole which fully uses the best capacities of each. Thereby, a highly practical Chinese character inputting system with universal adaptability is established.

There are a plurality of Chinese character inputting methods dominated by the simplified form Chinese character radical disassembling inputting method and the original complex form Chinese character disassembling inputting method in the present invention. The other methods are added for the purpose of facilitating the use and study of the two dominant methods.

The Chinese character inputting method included in the present invention is designed with computer aided method, every criterion of which has been quantitatively analyzed to achieve the most desirable level.

The simplified form Chinese character inputting method and the original complex form Chinese character inputting method included in the present invention depend solely on radical information and avoid the complicated concept of character forms. Thus it is unnecessary for the operator to think of the encoding in a conventional way. All he/she has to do is to strike corresponding keys after disassembling the Chinese character into appropriate radicals. The efficiency of input can be improved significantly.

The Pinyin (phonetics) character and phrase conversion method included in the present invention is based solely on phonetic information. The operator may input Chinese characters even if he/she does not know how to write them.

The simplified form Chinese character radical disassembling inputting method and original complex form Chinese character radical disassembling inputting method in the present invention employ phrase aided intelligent identical codes processing, thereby the probability of occurrence of identical codes can be reduced significantly.

BRIEF DESCRIPTION OF THE DRAWINGS

FIG. 8 is a sample of characters of 16×16 dot matrix.

FIG. 9 is a sample of characters of 24×24 dot matrix.

FIG. 10 is a sample code table for original complex form Chinese character radical disassembling inputting method.

FIG. 11 is a sample code table for simplified form Chinese character radical disassembling inputting method.

FIG. 13 is a distribution chart of static frequencies on original complex form Chinese character radical disassembling inputting method keyboard.

FIG. 14 is a distribution chart of static frequencies on simplified form Chinese character radical disassembling inputting method keyboard.

FIG. 21 is a page selection keyboard page.

FIG. 22 is a status selection keyboard page.

FIG. 23 is a combined control keyboard page, and

DETAILED DESCRIPTION OF THE PREFERRED EMBODIMENT

Figure 1:
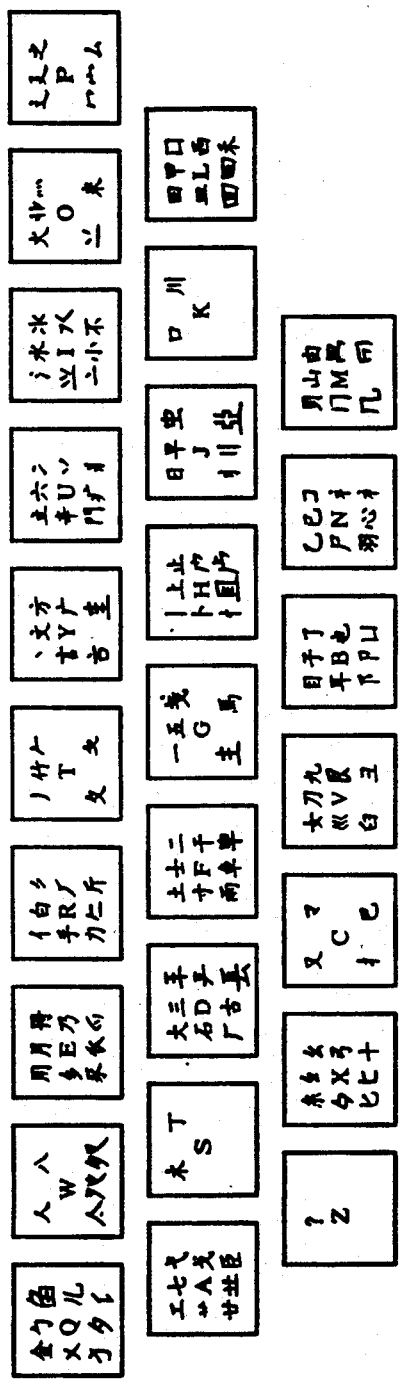
FIG. 1 is a radical keyboard page for original complex form Chinese character (mode Q).

Advanced research methods have been used in the development of the present invention. The implementation of each step is performed by computers, and in turn, the process of implementation is performed by computers. Data information for determining the research direction of the next step have been provided.

The present invention has reviewed first the various relationships between the simplified form and original complex form Chinese character, developed powerful character generating software, and generated 16×16 and 24×24 dot matrix original complex form character libraries (sample characters as shown in FIG. 8 and FIG. 9) which have greatly facilitated the research of original complex form Chinese character inputting method.

The present invention comprises: two high speed radical disassembling inputting methods, a Pinyin conversion method, two easy-to-learn stroke inputting methods and six auxiliary combined inputting methods, four auxiliary inputting methods, two auxiliary learning methods, and a simplified form/original complex form Chinese character conversion method. In addition, the region-location, national standard, and telegraph inputting methods are also included in the practical system according to the present invention.

Each inputting method uses different code dictionary while all inputting methods use the same phrase bank. This phrase bank only provides codes for high speed original complex form and simplified form radical disassembling inputting methods, while phrase codes of other methods are generated temporarily when being used.

In order to make the present invention further concrete and practical, a Chinese character inputting system has been developed simultaneously with the accommodation of the Chinese character inputting methods. For the hardware, this system comprises Chinese character keyboard and display device. For the software, this system comprises external code system, internal code system, conversion method between the external code and internal code, as well as simplified form and original complex form Chinese character dot matrix library.

The Chinese character keyboard of the present invention is a standard English keyboard adapted for Chinese character or a dedicated Chinese character keyboard. They are defined in multiple levels. For clarity, the concept "keyboard page" is introduced in the present invention.

The keyboard page is a logical page rather than a physical page. A keyboard page is a definition table of the whole keyboard or a portion of the keyboard. A keyboard page on the surface means that the system acquiesces that the corresponding portion of the keyboard uses this definition table.

The keyboard pages associated with the keyboard cannot be all on the keyboard surface concurrently, but only some of the keyboard pages can be on the surface while the other pages are being covered. When necessary, appropriate keyboard page(s) can be adjusted onto the surface with the changing page control keys or the combined control keys, e.g. currently, the "Pinyin keyboard page", keyboard page for Chinese character double solid line form-making symbols" and a part of the "ASCII keyboard page" are on the surface. If it is desired to adjust the "keyboard page for original complex form", "keyboard page for Chinese character punctuation symbol" as well as the "keyboard page for Chinese character solid line form symbols" onto the surface, all needed to do is just to press the "radical key" (ALT+F2), "punctuation" key (ALT+F9) on the page selection keyboard page, and the "original complex form/simplified form" key (SHIFT+F4), "solid line/double solid line" key (SHIFT+F5) on the combined control keyboard page.

The Chinese character display device of the present invention is a common display device, the screen of which is divided into a common editing area and a Chinese character inputting prompting area. The prompting area is a window for man-machine interacting in Chinese character inputting, which is an indispensable auxiliary tool in Chinese character inputting.

The prompting area can be either permanent or temporary. A temporary prompting area is one which covers on the editing area when needed and disappears automatically when no more is needed. The size and position of the prompting area can be either fixed or variable. The prompting area can be several lines, several columns, and a location for several characters on the screen. The prompting area can be placed on the upper part, lower part, right part, any other parts of the screen without interference with the editing operation. The prompting area can be distinguished from the editing area by different background color or character color.

The external code system of the present invention includes various regularly encoded Chinese character external codes. Those codes correspond to the keys on the keyboard according to certain rules. The system composed of those codes is generally referred to as Chinese character encoding scheme. The Chinese character encoding schemes associated with software support and auxiliary inputting methods constitute a practical Chinese character inputting method. The external code system of the present invention is composed of various inputting methods of the present invention.

The internal code system of the present invention is composed of the sequential codes of Chinese character in the computer or other processing machines, just like the ASCII codes of English characters. The present invention adopts multiple internal code systems, and supports both Chinese National Standard Internal Code and BIG-5 Internal Code of Taiwan, as well as the simplified form-original complex form corresponding internal code unique to the present internal code system. The simplified form-original complex form corresponding internal code is developed based on the dual-byte region-location code of the Chinese National Standard GB2312-80 Chinese character Basic Set for Information Interchange. The most significant bits of both bytes are set to "1" for codes of simplified form Chinese characters, while the most significant bit of the second byte is reset to "0" for the codes of the 2218 original complex form and variant Chinese characters with the other bits unchanged by their corresponding simplified Chinese characters, so as to differentiate them from the simplified form ones. Furthermore, 121 original complex form and variant Chinese characters are added for storing the multiple original complex form or variant character corresponding to each single simplified form character. The most significant bits of the second bytes of those added internal codes of Chinese characters are also set to "o", and they are located in the unused 14th and 15th regions of the National Standard Region-Location System of China.

The conversion method of the external and internal codes of the present invention is in fact the implementing method of each of the input methods. Since there are a series of Chinese character inputting methods from simple and easy-to-learn ones to quick and efficient ones, their implementing methods are also of manifold types. There are one-to-one correspondent linear reference table in the order of internal code sequence, two-level index table in the order of external code sequence, phrase table with index in the order of internal code without external code, and pointer reference table in the order of internal sequence. These reference tables associated with software techniques such as pattern mask comparing, can realize the various inputting methods of the present invention.

The simplified form and original complex form Chinese character dot matrix library of the present invention comprises a 16×16 dot matrix simplified form Chinese character library, a 24×24 dot matrix simplified form Chinese character dot matrix library, a 16×16 dot matrix original complex form Chinese character dot matrix library and a 24×24 dot matrix original complex form Chinese character dot matrix library (sample characters as shown in FIG. 8 and FIG. 9) on the basis of Chinese National Standard GB2312-80 Chinese character Basic Set for Information Interchange. The 2218 Chinese characters having corresponding original complex characters or variant characters are changed into their corresponding original complex form or variant characters. The other characters are not changed. In addition, 121 original complex form and variant characters are added for storing the multiple original complex form characters corresponding to each single simplified form character. The character set thus generated is digitized into 16×16 and 24×24 dot matrixes, which form the original complex form character dot matrix library of the present invention.

The implementation of each inputting method included in the present invention are as follows:

1. Original complex form Chinese character radical disassembling inputting method and simplified form Chinese character radical disassembling inputting method.

In order to implement the original complex form Chinese character radical disassembling inputting method and simplified form Chinese character radical disassembling inputting method, the present invention has conducted basic research works on Chinese character. There are three morphological types of radical: stroke, radical in common sense, and radical group. The stroke is a continuous line segment in writing Chinese characters. The present invention adopts the classification and sequence of Chinese character strokes of the Chinese National Standard GB 2312-80, i.e. five basic strokes of " ‾ ｜ ﾉ ＼ ㇹ ". Common sense radical refers to those structures composed of intersecting and nested strokes having certain geometrical shapes and unchanged for a long time during the history of Chinese character's development. Radical group refers to a group of radicals having common geometrical characteristics. Both the simplified form radicals and the original complex form radicals adopted by the present invention comprise 187 radicals. A Chinese character is composed of radicals with certain order and relationship of geometrical position. Phrases are formed with two or more Chinese characters. The present invention can provide 5,000 or 30,000 or 100,000 phrases according to user's requirements. The present invention further creates two Chinese character attribute library and an everyday phrases bank which includes information of the order of strokes, disassembling sequence of strokes, disassembling sequence of radicals, up-to-date practical frequency, Pinyin code, National Standard code and telegraph code for each simplified form and original complex form Chinese character. In addition, a series of computer aided design programs have been developed and comprise: statistical analysis program for frequency of usage and capability of character formation of radicals; program for automatic selection of radicals according to usage frequency and capability of character formation evaluated by restricted conditions; programs for automatic code generation of Chinese characters and phrases, automatic simplified form code generation of different levels, automatic counting of identical codes by using of the Chinese character attribute library; automatic statistic program for identical codes; automatic analysis program for identical code result provided for manual interference; automatic calculating program for static and dynamic code length under various conditions; automatic calculating programs for probability of keys, second order probability of keys, probability of code sequence of keys and code element entropy; automatic calculating program for encoding efficiency; and printing program for individual character code tables and phrases code tables in the order of National Standard Code and local code as well as radical disassembling.

For determining the encoding radical set, the disassembling of characters into radicals and strokes in ordinary Chinese Dictionaries is taken into consideration first; then a rather complete primitive radical set is selected. A code is assigned to each radical. The National Standard Chinese Characters are disassembled and encoded according to this radical set to generate a direct code set of radicals. The occurrence of character forming frequency of each radical is counted; then the code of each radical constituting a certain character in the National Standard Set is weighted by the usage frequency of this character, thereby the practical frequency of each radical can be calculated. Finally, a synthetical consideration of the factors of conventional disassembling custom, character forming frequency, regular pattern of memory, and amount of information are made to select a collection of radicals with higher representative, thereby a primary selected radical set is obtained.

In order to create a primary code set, the selected radicals are divided into groups according to the requirements of number of keys, similarity, and convenience of memory, and the total frequencies of radical of each group are adjusted to be approximately equal. The deleted radicals are composed of the radicals of the primary radical set by utilizing the direct code set of radicals generated in the selection of radicals, and all radical codes are substituted with the codes of the groups they belong to, a fully disassembled primary code set is then generated.

The code of each character is limited within four keys (code elements) to increase the input speed, to improve the efficiency, and to reduce the redundancy. Therefore, for each Chinese character having four radicals in its radical disassembling sequence, all the codes of these four radicals are taken as the code of this Chinese character.

For each Chinese character having more than four radicals in its radical disassembling sequence, the fourth through the second to the last radicals in the sequence are deleted, and the remaining radicals are used to encode this Chinese character.

For each Chinese character having less than four radicals in its radical disassembling sequence, the last stroke of this character is appended to its disassembling sequence, so as to reduce the identical codes. For each Chinese character itself is a radical and the number of disassembled radicals after being added by the last stroke thereof is still less than four, it is further added by itself, and the codes of radicals in the radical sequence thus formed are taken as the code of this Chinese character.

In practice, a correspondence table between the external input keys and the internal code table is created in the present invention, so as to facilitate timely rearrangement of the keys defined with groups of Chinese character radicals according to frequencies of usage and preference of the operator. If the user modifies this table, he/she can change the definition of the keys. As examples, two different key distributions, "Q" mode and "X" mode, are provided in FIGS. 1, 2, 3, and 4.

Figure 2:
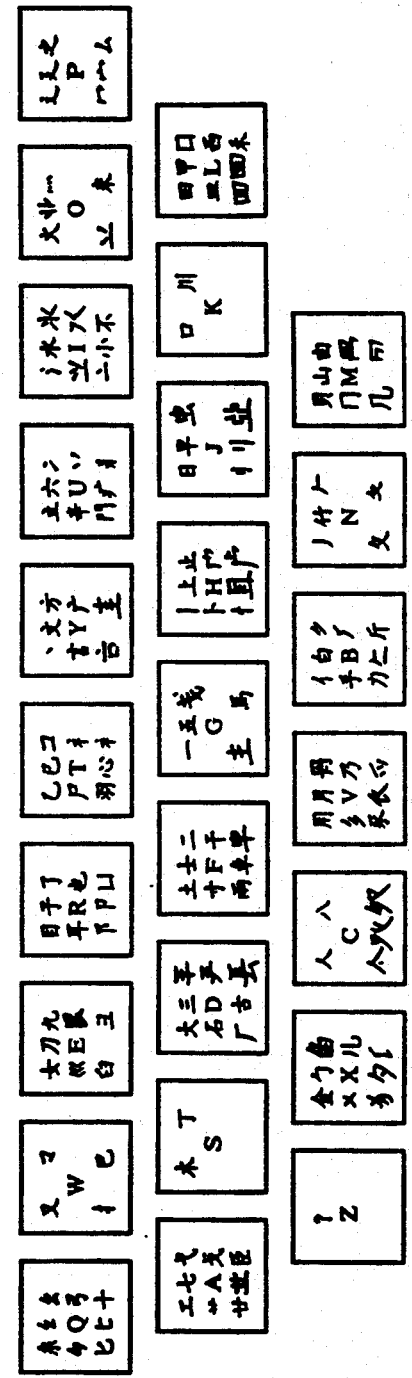
FIG. 2 is another radical keyboard page for original complex form Chinese character (mode X).
Figure 3:
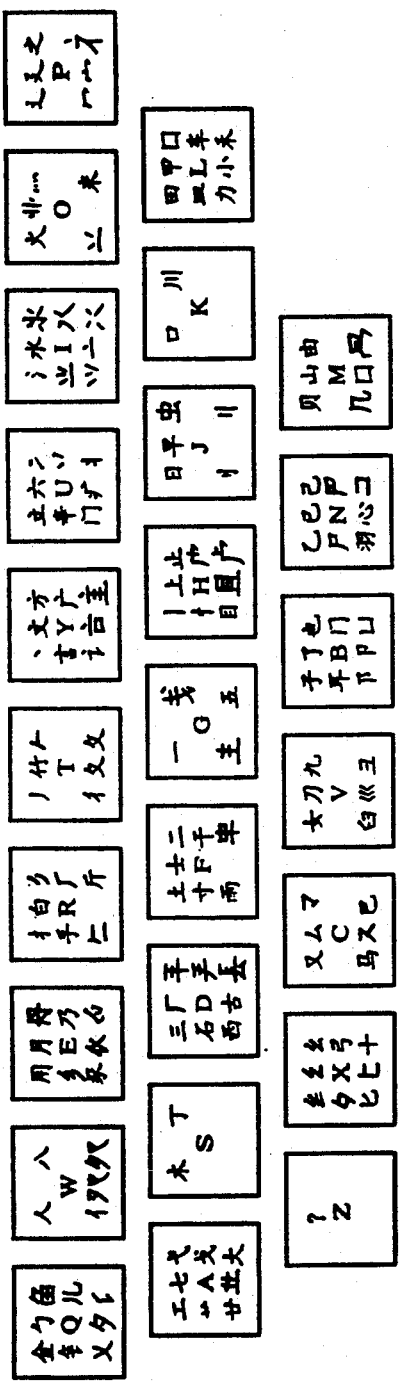
FIG. 3 is a radical keyboard page for simplified form Chinese character (mode Q).
Figure 4:
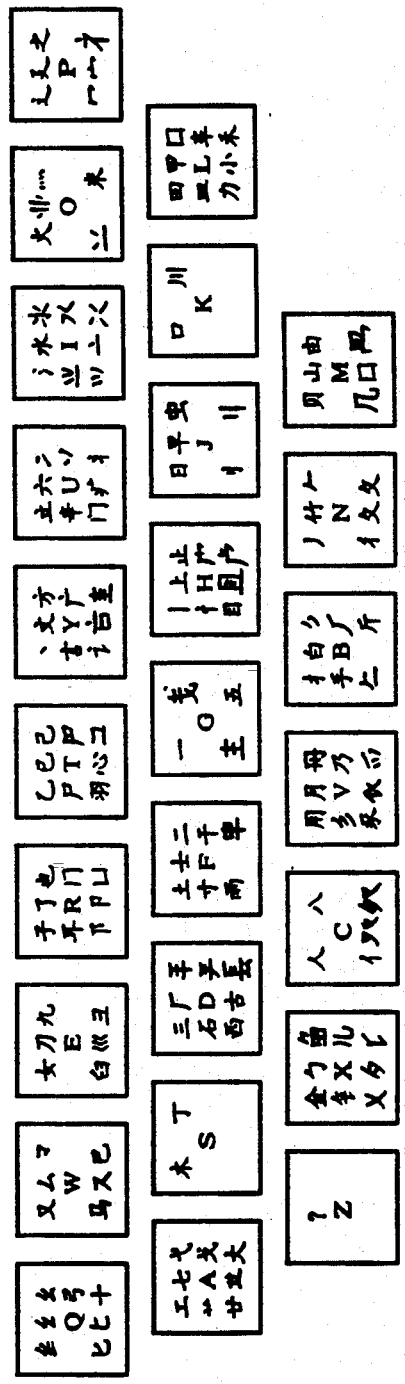
FIG. 4 is another radical keyboard page for simplified form Chinese character (mode X).

For instance, the correspondence table of changing Q-mode keys (as shown in FIG. 1 and FIG. 3) into X-mode keys (as shown in FIG. 2 and FIG. 4) is that the external input keys "abcdefghijklmnopqrstuvwxyz" are converted into "arwdvfghijklmtopxbsnuecqyz". This correspondence table exchanges five keys of "qwert" with "xcvbn". To achieve this conversion, the user only needs to press the "Q/X Mode key" (shift+F6) on the "combined control keyboard page " (FIG. 23). If the user wants to achieve further completed conversions, he/she may specifically modify the "correspondence table" supported by special application procedures.

After the primary encoding has been fulfilled a multiple criteria coding analysis has to be made so as to determine a simplified form code set and the orders of identical codes.

The primary codes are sorted in ascending or descending order. In the sorted file, equally adjacent codes are referred to as identical codes. In order to determine the simplified codes, the result of sorting is divided into groups; providing the number of keys is K and the limit of code length is 4, the codes can be divided into groups on three levels:

A. One code element (key) grouping: the code subset with equal first code element is regarded as a group, thus the result is K groups.

B. Two code element grouping: the code subset with equal first and second code elements is regarded as a group, the result should be equal to or less than $K-2$ groups.

C. Three code element grouping: the code subset with equal first, second, and third code elements is regarded as a group, the result should be equal to or less than $K-3$ groups.

For each grouping, the codes in each group are investigated in the following aspects:

A. Identical codes: for identical codes, the priority of assigning simplified form codes is given to those with higher frequencies of usage, so as to reduce identical code rate and identical code processing rate.

B. The last stroke: the priority of assigning simplified form codes is given to those with appended last stroke to reduce the workload of the operator caused by adding the last stroke.

C. Frequency: the priority of assigning simplified form codes is given to those with higher frequencies to reduce the dynamic average code length and increase inputting speed.

According to the result of investigation and certain algorithm for determining the priority levels, a simplified code can be determined in each group.

After the simplified form codes have been determined, a synthetic consideration of each identical code group is made in the following aspects:

A. Frequency:

Generally, the characters in each duplicatively coded Chinese character group are sorted according to their frequencies of usage, and the character with the highest frequency is defined on the default position.

B. Simplified code:

If the character with highest frequency has been defined with simplified form code, the character with the second to the highest frequency is defined on the default position.

According to the result of investigation and certain priority level algorithm, a character can be selected and defined on the default position from each duplicatively coded Chinese character group. In practice, when an operator encounters a group of duplicatively coded Chinese characters, some of the duplicatively coded characters are substituted into the context. Investigation is then made to determine whether one and only one of the duplicatively coded character constitutes a meaningful phrase. If so, this character is regarded as default one; otherwise, the system will prompt the operator with a specific sound to key in a numerical key to select a Chinese character therefrom. If no selection is made but directly input the succeeding character, the system will accept the Chinese character defined on the default position automatically.

For the above result, quantitative analysis is made by investigating the following important criteria:
  A. Number of identical codes;
  B. Rate of identical codes;
  C. Processing rate of identical codes;
  D. Probabilities of keys;
  E. Second order probabilities of keys;
  F. Probabilities of key code sequences;
  G. Code element entropy;
  F. Static average length of full codes; and
  I. Dynamic average length of simplified form codes.

Synthetic evaluations are made on the above criteria of quantitative analysis with respect to the object of design, for those unsatisfactory criteria. Their causes are analyzed and corresponding actions are taken, e.g., reducing the radicals, adjusting the radicals, adding the radicals, modifying the rules, etc. Then a new code set is generated accordingly. Analysis is made again on the newly generated code set. Those work are repeated until an ideal result is obtained.

After the encoding of individual characters has been completed, encoding of phrases can be considered. A basic phrase set (vocabulary) is selected first, e.g., 30,000 phrases, then the code of each character of a certain phrase is fetched from the individual character code set. The code element on the specific position of the code of each character is extracted to construct the code of this phrase. The phrase code set is composed of all the phrase codes thus constructed. It is allowed for user to define the phrase encoding method, for example, user can define phrase encoding method as following:

For two character phrase, the phrase code is composed of the first two codes of each character;

For a phrase containing more than three characters, the phrase code is introduced by a special key, e.g., "N" or "Z" and composed of the first code of each character.

Figure 10:
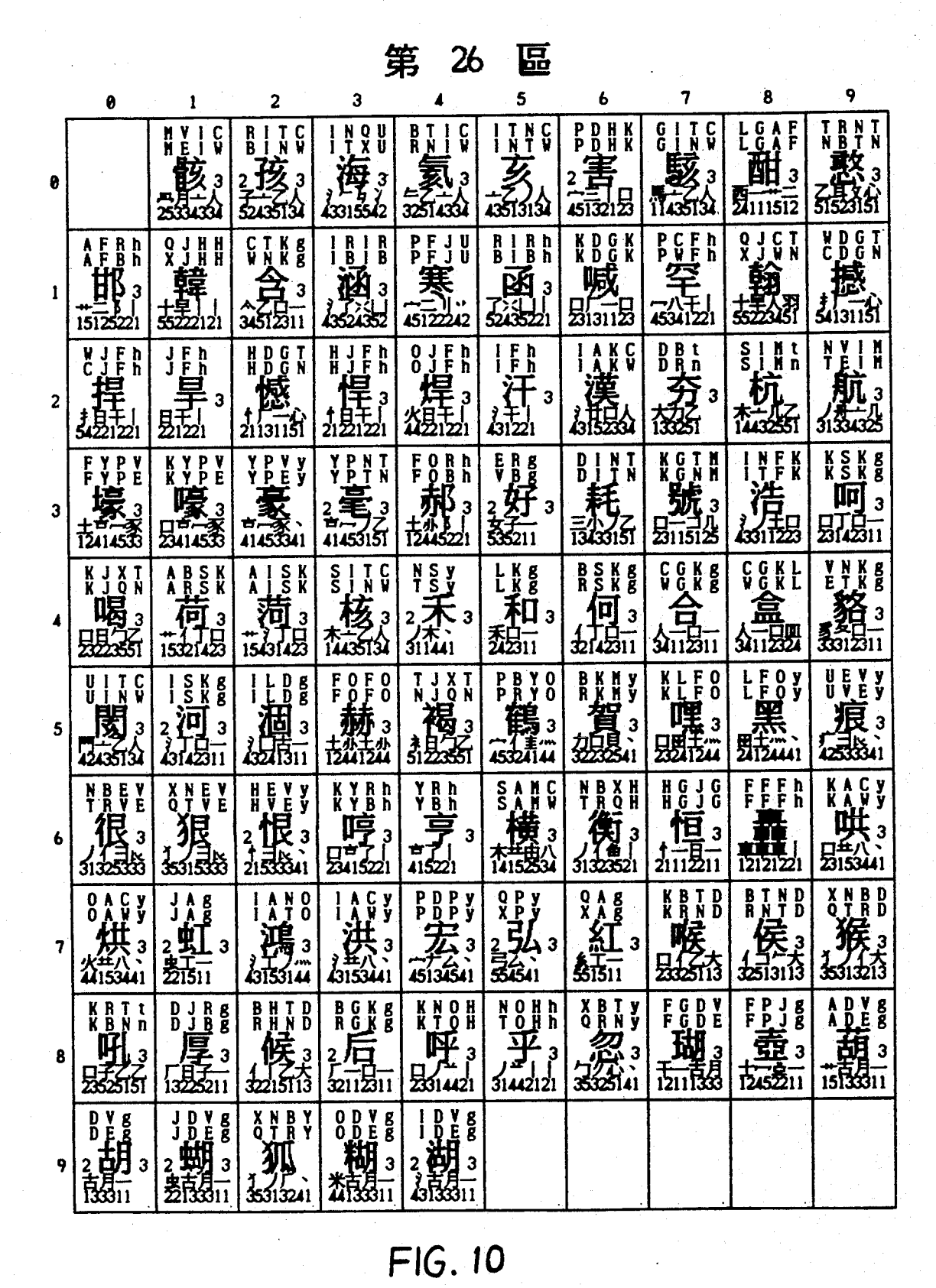

Combining the full code and simplified form code of each Chinese character according to certain formats, code tables in the order of National Standard Codes or local codes can be printed (sample code tables shown in FIG. 10 and FIG. 11).

The original complex form radical and simplified form radical Chinese character inputting methods are established just like this.

The finally established original complex form and simplified form Chinese character radical disassembling inputting methods include 187 basic radicals. Those radicals are divided into 25 groups positioned respectively on 25 keys out of 26 English alphabetic keys to form the keyboard pages of original complex form radicals and simplified form radicals, as shown in FIGS. 1 through 4. On the keyboard pages of FIG. 1 and FIG. 3, the distributions of frequencies are illustrated in FIG. 13 and FIG. 14. It can be seen that the distribution is basically in conformity with the requirement of fingering.

Sample sheets of code tables of unsimplified radical and simplified form radical of Chinese character inputting methods in GB2312-80 sequence are illustrated in FIG. 10 and FIG. 11. The whole code table is paged according to regions. Each page is partitioned into 100 blocks. All Chinese characters in a region are placed in 94 blocks thereof. There are five rows of information in each block. The first row is the code of "X" mode, the second row is the code of "Q" mode, the third row is the Chinese character itself and flags of second and/or third level simplified code, the fourth row is the disassembling of radicals, and the fifth row is the numeric codes of the radicals.

When an arbitrary Chinese character is being encoded and input with original complex form or simplified Chinese character radical disassembling inputting method, the first, second, and third radicals in the writing order of the character are disassembled first. If there is any radical remained, the last radical is disassembled directly. If the whole character has been fully disassembled within 3 radicals, the last stroke of the whole character is appended to the sequence of disassembled radicals, e.g.:

德 - ノ(T) 亻(R)+(X)心(N)
杯 - 十(H)不(I) 、(Y)

For Chinese characters themselves are radicals, they are disassembled into smaller radical sequences using the above method. If the length of the sequence is less than 4, the character itself is appended to the disassembled radical sequence, e.g.:

甲 - B(T) l (H) i (H) 甲(L)
马 - 十(D) 与(N) ㅡ(O) 、(Y)

This method does not specifically consider about the problems of key name, pattern, cross-recognition, etc.

The first, second, and third level simplified form codes and phrases codes are automatically defined by the system with the above method, e.g.:

依 -
Full code:                          亻(R)㇏(I)水(E)丶(Y)
Third level simplified form code:   亻(R)㇏(I)水(E)
Second level simplified form code:  亻(R)㇏(I)
依据 -
Phrase code:                        亻(R)㇏(I)扌(W)尸(M)

2. Pinyin/character and phrase conversion method.

The method has an independent Pinyin-Chinese character corresponding table, while using the common phrase bank.

When inputting a Chinese character, the first or first several Pinyin alphabets are input and the character will be displayed in the prompting area. If this character is required, the corresponding selecting key is pressed, otherwise if a phrase beginning with this character is required, then the first several Pinyin alphabets of the second Chinese characters can be keyed in regardless of how many Pinyin alphabets of the first character have been keyed in. This phrase will be displayed in the prompting area, otherwise the first several Pinyin alphabets of the third character are keyed in successively until this phrase is displayed in the prompting area, e.g.:

The individual Pinyin conversion codes for

" 中  华  人  民  共  和  国 "
are:
ZHONG HAU REN MIN GONG HE GOUG;

As a phrase, it has the following keying in methods:

ZHHRMGHG
ZHOHUAREGHG
ZHONGHUA-R-M-G-H
...

The internal implementing method of this conversion method is:

(1) Create a correspondence table for each Chinese character with its Pinyin code sequence (including Pinyin alphabet and tone indicating character), which is referred to as basic Pinyin table;

(2) Employ a common dynamic phrase bank;

(3) When the first or first several alphabets of the Chinese character's Pinyin are input from the keyboard, all Chinese characters having the same Pinyin alphabet sequence of the first several alphabets with the inputting sequence are retrieved by software, which further determines whether to send the retrieved Chinese character to the prompting area or to wait for the keyboard to continue the inputting until an ending character (usually the space character) is received depending on whether it is in the automatic state or not currently;

(4) If an ending character is received or it is in the automatic state, the retrieved Chinese characters are sent to the prompting area for selecting;

(5) If a numeric character is received from the keyboard, the corresponding Chinese character is sent out; if a connecting character is received (usually "-" or ""), processing returns to step (3); if an alphabetic character is received, this alphabet is appended to the alphabet sequence of step (3) and if this sequence as the first several alphabets of a Chinese character's Pinyin is determined, processing returns to step (3), otherwise goes to the next step;

(6) This key and the successive keys are regarded as the first several alphabets of the next Chinese character's Pinyin, and all Chinese characters having the same first several Pinyin alphabets are retrieved;

(7) If the arrangement of these Chinese characters with the previous retrieved Chinese characters matches with some of the phrases in the phrases bank created in step (2), these phrases are retrieved and processing returns to step (3), where the phrase is processed in the same manner as individual characters, otherwise the first Chinese character of the prompting line is sent out. The Chinese characters retrieved in step (6) are displayed in the prompting area; the conversion can therefore be performed by this processing loop; at the same time with the conversion, the Chinese characters separated by phrases and punctuation symbols in the input Chinese character stream are not separated, then they are added into the common dynamic phrase bank as a phrase, so that they can be thereafter input as a phrase.

3. Fully disassembled stroke inputting method.

This method disassembles each Chinese character into a sequence of five basic strokes according to the partition and sorting of the five basic strokes 乙 丶 丿 丨 一 of GB 2312-80 to create a correspondence table from the internal code of each Chinese character to its stroke sequence. The software processing of this method is very similar to that of the Pinyin/character and phrase conversion method.

When a Chinese character is inputted with this method, all or first several of the strokes constituting this Chinese character may be inputted, and this Chinese character will be displayed in the prompting area.

Using this method to input a phrase, it is only needed to input the first several strokes of each Chinese character successively. The more strokes input, the easier this phrase to be found, e.g.:

专 :-- 一 一 丿 丶

家 :-- 丶 丶 フ 一 丿 丨 丿 丿 丶

There are the following various inputting keying-in methods to input "中华人民共和国":

丨 丿 丿 フ 一 丿 丨

丨 フ 一 丨 丿 丨 丿 乚 一 丨 丿 乀 フ 一 丨 一 乀 一 丨 丨 一 丿 八 丿 丨

丨 丿 丿 フ 一 丿 一 丨 丿 丶 丨 フ 一 丨 フ 一 一 一 丨 一 丶 一

4. Combined radical and stroke inputting method.

In this inputting method, the left side alphabetic keyboard can be used for inputting Chinese characters according to the original complex form radical or simplified form radical inputting method, while the right side numeric keyboard can also be used for inputting Chinese characters according to the fully disassembled stroke inputting method. Also, characters can be inputted by using the left side alphabetic keyboard to input 1-3 radicals first, then using the right side numeric keyboard to input several strokes, or vice versa. The system takes the intersection of the set of Chinese characters hit by the code input from the left large keyboard and the set of Chinese characters hit by the code input from the right small keyboard as set of hit Chinese characters and displays these characters in the prompting area for selecting. If only one Chinese character is hit, it is accepted directly without requesting for selecting. This method can be used in original complex form Chinese character, i.e., original complex form radical and stroke combined inputting method. This method can also be used in simplified form Chinese character, i.e., simplified form radical and stroke combined inputting method. If simplified form radical and stroke combined inputting method is used to input the character "来", there are various keying-in methods as follows:

丿 (I) 丆 (V) 八 (W) 木 (S)
丿 (I) 刀 (V) 八 (W) 丶 (4)
丶 (4) 丶 (4) —(1)? (Z) 刀 (V)
...

5. Combined radical and Pinyin inputting method.

In this inputting method, the downshift keys can be used for radical inputting method, while the upshift keys can be used for combined input with Pinyin/-character and phrase conversion method. The system takes the intersection of the set of Chinese characters hit by the code input from the downshift keys according to the original complex form radical or simplified form radical inputting method and the set of Chinese characters hit by the code input from the upshift keys according to the Pinyin/character and phrase conversion method as the set of hit Chinese characters and displays these characters in the prompting area for selecting. If only one character is hit, it is displayed directly without requesting for selecting. This method is used in the original complex form Chinese character, i.e., original complex form radical and Pinyin combined input method. This method is also used in the simplified form Chinese character, i.e., simplified form radical and Pinyin combined inputting method, e.g.:

These are the following different keying-in methods for inputting the character "来"::

```
 ； (I)  刀 (V)       1(1)   1(1)
 ； (I)  刀 (V)  八 (W)      1(1)
1(1)  ； (I)  刀 (V)  八 (W)
1(1)  1(1)   a(a)    ； (I)
```

6. Combined stroke and Pinyin inputting method.

In this method, the combined inputting of a Chinese character utilizes the left side alphabetic keyboard according to Pinyin/character and phrase conversion method and the right side numeric keyboard according to fully disassembled stroke inputting method. The system takes the intersection of the set of Chinese characters hit by the code input from the left side big keyboard and the right small keyboard as the set of hit Chinese characters and displays them in the prompting area. If only one Chinese character is hit, it is displayed directly without requesting for selecting. This method can be applied to original complex form Chinese character, i.e., original complex form stroke and Pinyin combined inputting method. This method can be applied to simplified form Chinese character, i.e. simplified form stroke and Pinyin combined inputting method, e.g.:

There are the following different keying-in methods to input the character "染":

```
1(1)  1(i)  、(4)  、(4)  —(1)
、(4)  、(4)  —(1)  1(1)  1(i)  a(a)
...
```

7. Intensified associative auxiliary inputting method.

This is an auxiliary inputting method. It can be used in combination with other inputting methods without affecting the use of original method, but the input of each Chinese character will cause the display of all the phrases including this character in the prompting area for selecting. If the desired phrase does not appear in the prompting area, the "TAB" key can be pressed to continue the search in succession. In fact, at the input of each Chinese character, the system takes this Chinese character or the last Chinese character of this phrase as the source of association to compare with each Chinese character in all phrases in the phrase bank of the system. All the phrases containing the source of association are regarded as hit phrases to be displayed in the prompting area for selecting, e.g.:

If the character "道" input, the following phrases are displayed in the prompting area:

"联想：0 道  1 道德 2 道理 3 道路 ....9 难道  "

If the "TAB" key is pressed, the following phrases are displayed in the prompting area in succession:

"联想：0 道 1 计划 2 知道 3 跑道 ...9 过道 "

If the key "1" is pressed, "计划" will be displayed in the editing position.

8. Fuzzy auxiliary inputting method.

During the inputting of Chinese characters with any inputting method, if a doubtful code element is encountered, the keys "?" or "Z" or "6" or "N" can be used in substitution as a wild card; the system will automatically find the Chinese characters satisfying this condition. If there is only one Chinese character meeting this condition, it is provided directly, otherwise all the characters meeting this condition are displayed in the prompting area for selecting, e.g.:

In the Pinyin character and phrase conversion method, "?" can be used as the fuzzy key. If "?NG" are keyed in, the display in the prompting area is as follows:

"?ng 1 鞥 ANG 2 昂 ANG 3 盎 ANG 4 肮 ANGSI"

9. Automatic auxiliary inputting method.

This is an auxiliary inputting method. When any one of the inputting method is used for inputting Chinese characters in the automatic state, following the inputting of each key, the system displays all the Chinese characters or phrases with the first one of several keys identical with the input key(s) in the prompting area as the set of hit Chinese characters or phrases. At that time, if a selecting key is pressed on the keyboard, the corresponding Chinese character or phrase is sent out. If a coding key is input continuously, this key is appended to the input key sequence, and retrieval is restarted as before. This loop ends until a selecting key or ending key is input, e.g.:

If the original complex form radical inputting state, following the input of each key, the successive displays in the prompting area are as follows:

```
"w      1 人 W   2 么 WX   3 分 WV   4 父 WQ   5 公 WP"
"wn     1 个 WN  2 欠 WNK  3 夕 WNN  4 久 WNM  5 攵 WNI"
"wnn    1 么 WN  2 夕 WNN  3 冬 WNNY  4 处 CWNN 5 冬 AWNN"
"wnny   1 冬 WNNY"
```

Wherein, the lower case alphabets in the front of each line are the input codes, the upper case alphabets following each Chinese character are the code of this Chinese character.

10. Instant phrase composing auxiliary inputting method.

In any one of the Chinese character inputting or editing states, if it is desired to compose a string of Chinese characters as a phrase, this can be done by moving the cursor to the first character of this Chinese character string, pressing the "instant phrase composing key", then moving the cursor to the last character of this Chinese character string and pressing the "ending key". The system will store this Chinese character string scanned by the cursor in the phrase bank as a phrase. In addition, the system will automatically encode this phrase into various codes corresponding to each of the rules of inputting methods respectively, and in the subsequent Chinese character input, these codes can be used immediately for inputting this phrase.

11. Learning method with returned code.

This is an auxiliary learning method. In the learning state of an inputting method, when a Chinese character is input with another inputting method, the system will retrieve the internal-external code correspondence table of the inputting method being learned reversely to obtain the code of this Chinese character and display it in the prompting area, e.g.:

In the learning state of Pinyin inputting method, if the character "政" is input with simplified form radicals, the follow will be displayed in the prompting area:

"ghty  1 政 ZHENG"

12. Program for marking Chinese characters with Pinyin and telegraph codes.

An independent program developed for the learning method with returned code can be used for marking the Chinese character with Pinyin, telegraph, National Standard, was well as simplified form radical and original complex form radical codes. Providing a program for marking a Chinese character with its Pinyin code, named "ZR", is executed, when the Chinese string:

"简 繁 字 根 汉 字 输 入 法"

is input, it will be marked with Pinyin as follows:

"JIAN FAN ZI GEN HAN ZI SHU RU FA"
简 繁 字 根 汉 字 输 入 法

13. Learning method with returned radicals and strokes.

This is an auxiliary learning method. In the learning state of one of the Chinese character shape inputting method, if a Chinese character is inputted with another inputting method, the system automatically searches the radical disassembling or stroke disassembling table of the method to be learned reversely to obtain the disassembled radical sequence or stroke sequence of this Chinese character and displays it in the prompting area, e.g.:

In the simplified form radical learning state, if the character "繁" is input with original complex form radical, then the following will be displayed in the prompting area:

"mvmo 1 依 亻木一一"

14. Simplified/original complex form conversion method.

This method enables the obtaining of simplified form Chinese characters with the input according to original complex form characters, and vice versa. The problem of definitions with non-uniqueness in the conversion from original complex form character to simplified form one and vice versa in the cases of multiple original complex form Chinese characters corresponding to one simplified form character or vice versa can be solved by this method; the specific steps of this method are:

Selecting a certain amount of phrases including non-uniquely corresponding simplified form and original complex form characters to construct a dedicated phrase bank. When a text of simplified form characters is to be converted into one of original complex form characters with the simplified/original complex form conversion method, the Chinese characters in the text to be converted are investigated one by one. Direct conversions are made for those uniquely correspondent, while for those not uniquely correspondent, the internal dedicated phrase bank is searched for that character. After that character has been found, its corresponding original complex form (simplified) Chinese characters are investigated to determine which one may constitute a phrase in the context. If one exists, the original complex form (simplified) character contained in this phrase is just the original complex form (simplified) Chinese character to be converted, otherwise the user is requested to select one of them. In this case, the user may input an alphabetic key or the space bar, then the corresponding original complex form (simplified) character of this Chinese character will be displayed one by one. If the desired one appears, the "CR" key is pressed to represent the hit. The conversion can be fulfilled in this manner.

The present invention proposes a design scheme of multi-page keyboard in the designing of the keyboard, the capability of a standard keyboard is fully exploited.

Figure 5:
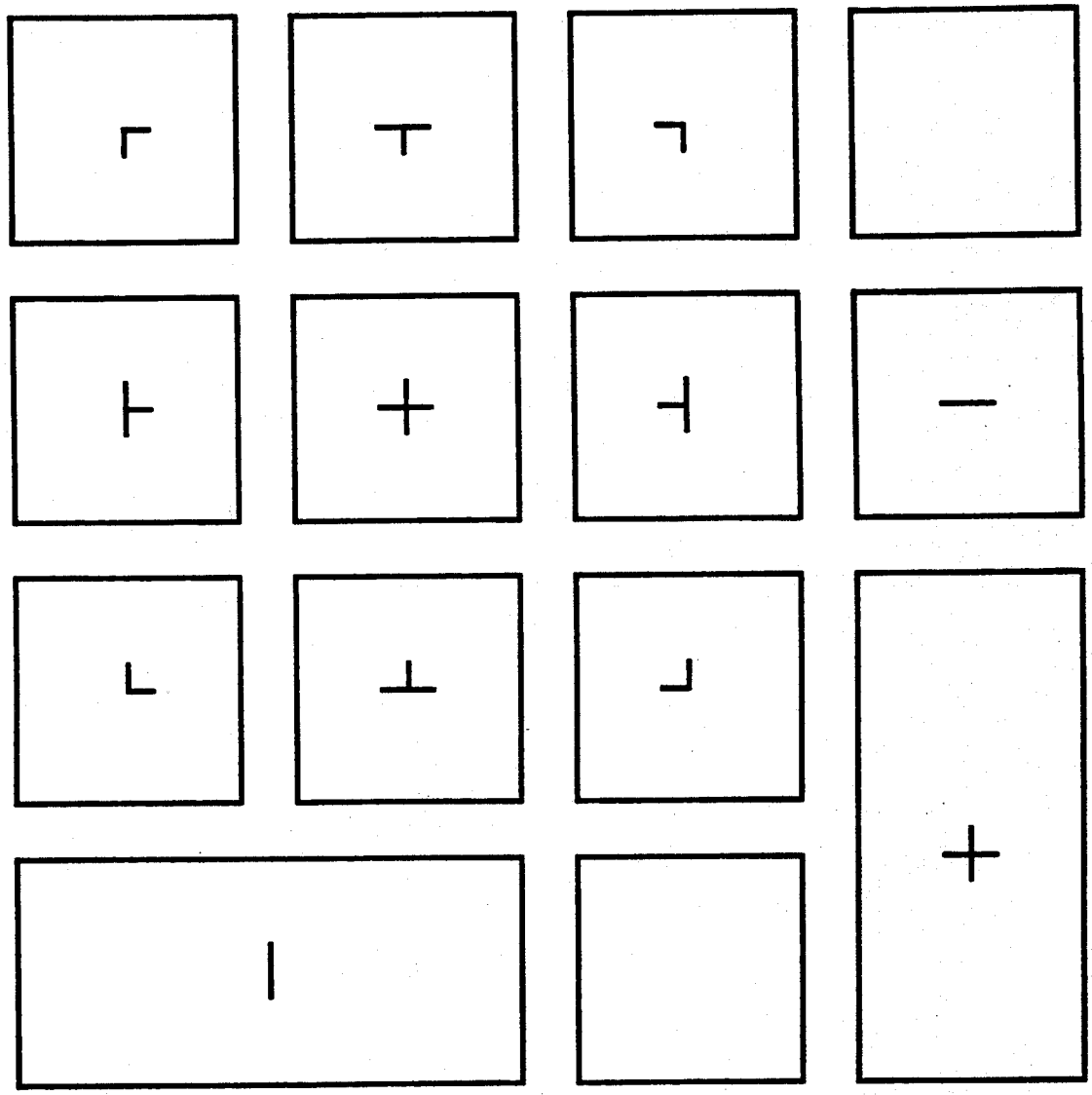
FIG. 5 is a keyboard page for Chinese character solid line form-making symbols.
Figure 6:
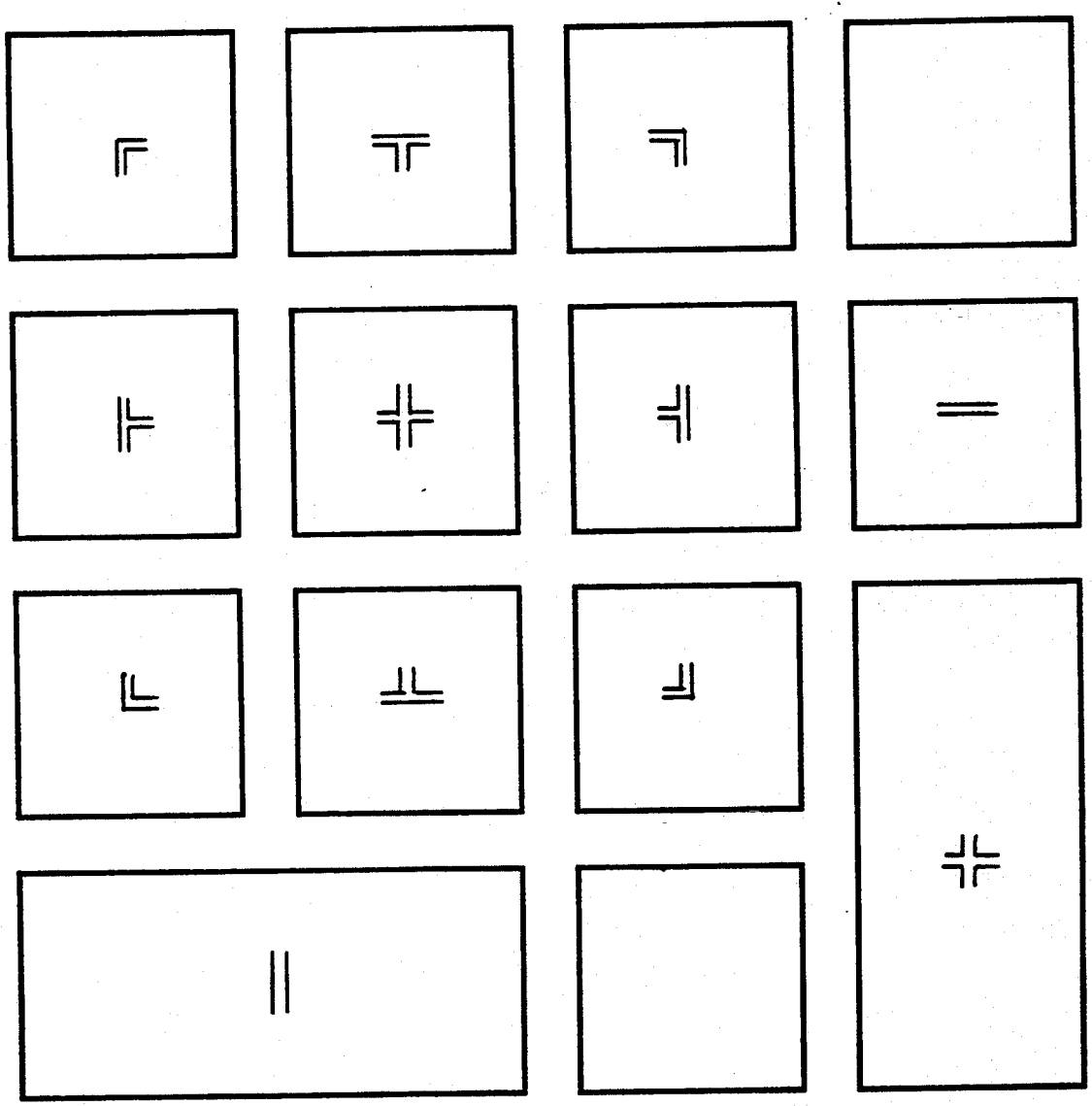
FIG. 6 is a keyboard page for Chinese character double solid form-making symbols.
Figure 7:
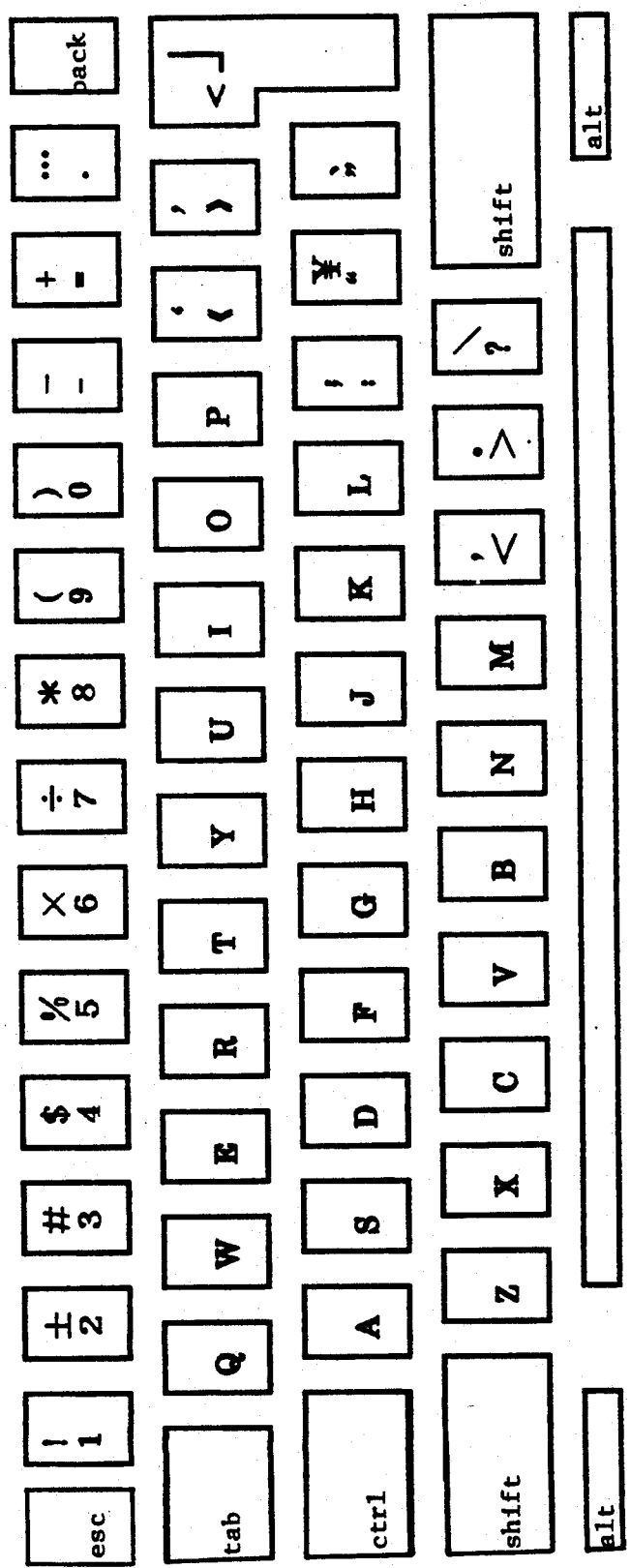
FIG. 7 is a keyboard page for Chinese character punctuation marks.
Figure 12:
FIG. 12 is a keyboard page for fully disassembled simplified form and original complex form stroke inputting method.
Figure 15:
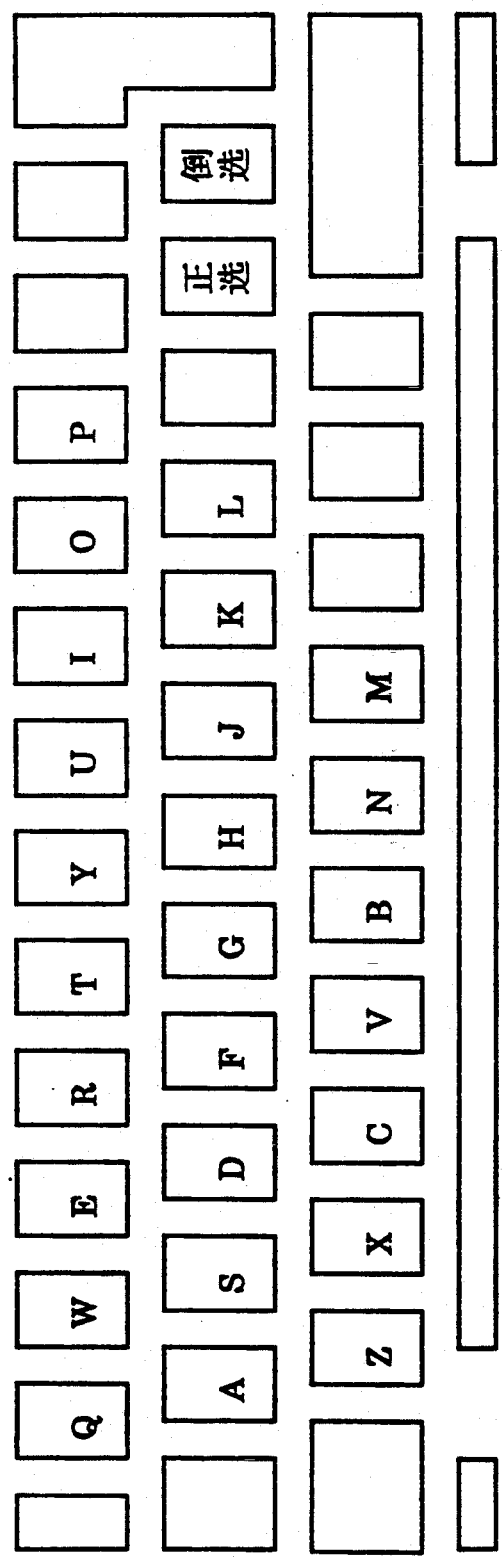
FIG. 15 is a Pinyin (phonetics) keyboard page.
Figure 16:
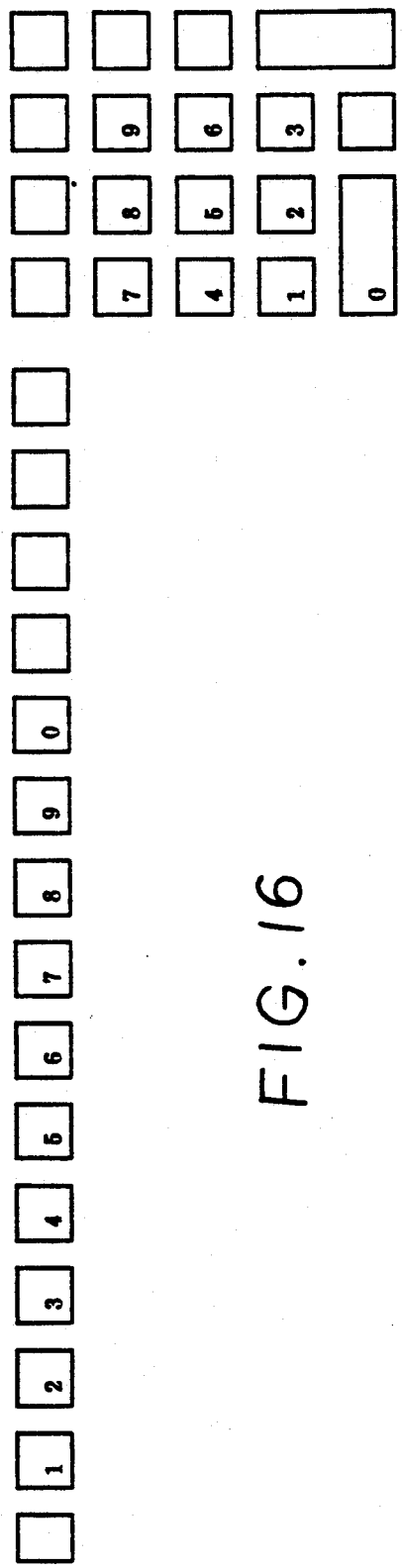
FIG. 16 is a telegram keyboard page.
Figure 17:
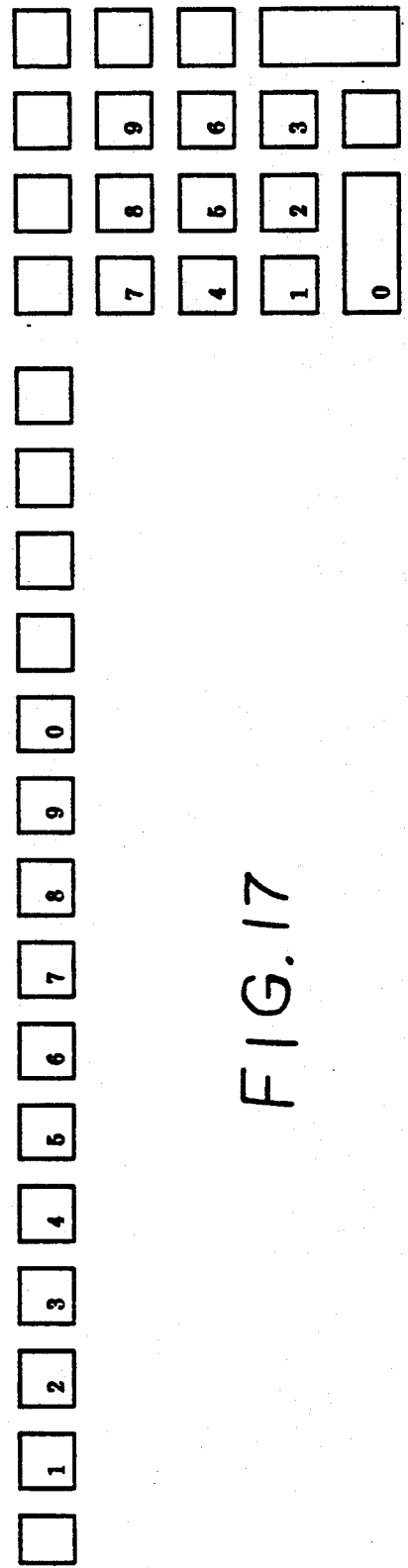
FIG. 17 is a region-location keyboard page.
Figures 18, 19:
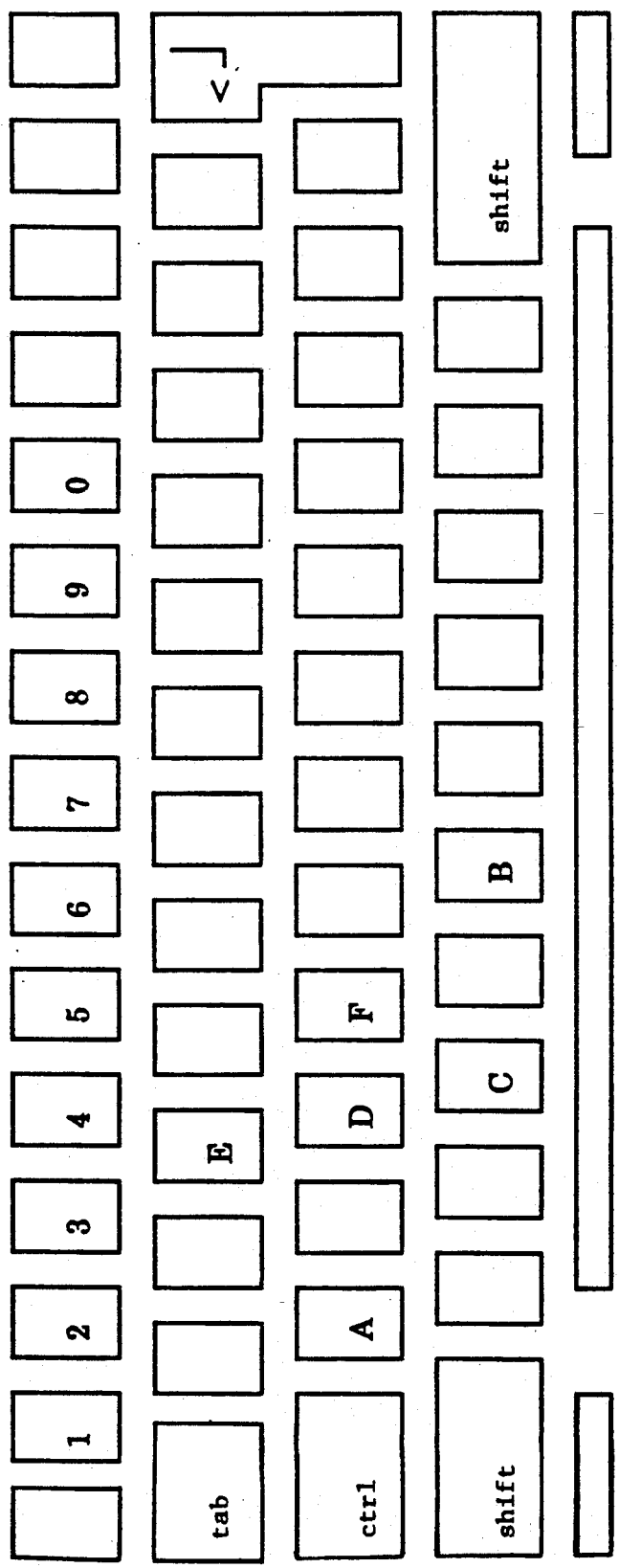
FIG. 18 is a national standard keyboard page.
FIG. 19 is a Chinese character selection keyboard page.
Figure 24:
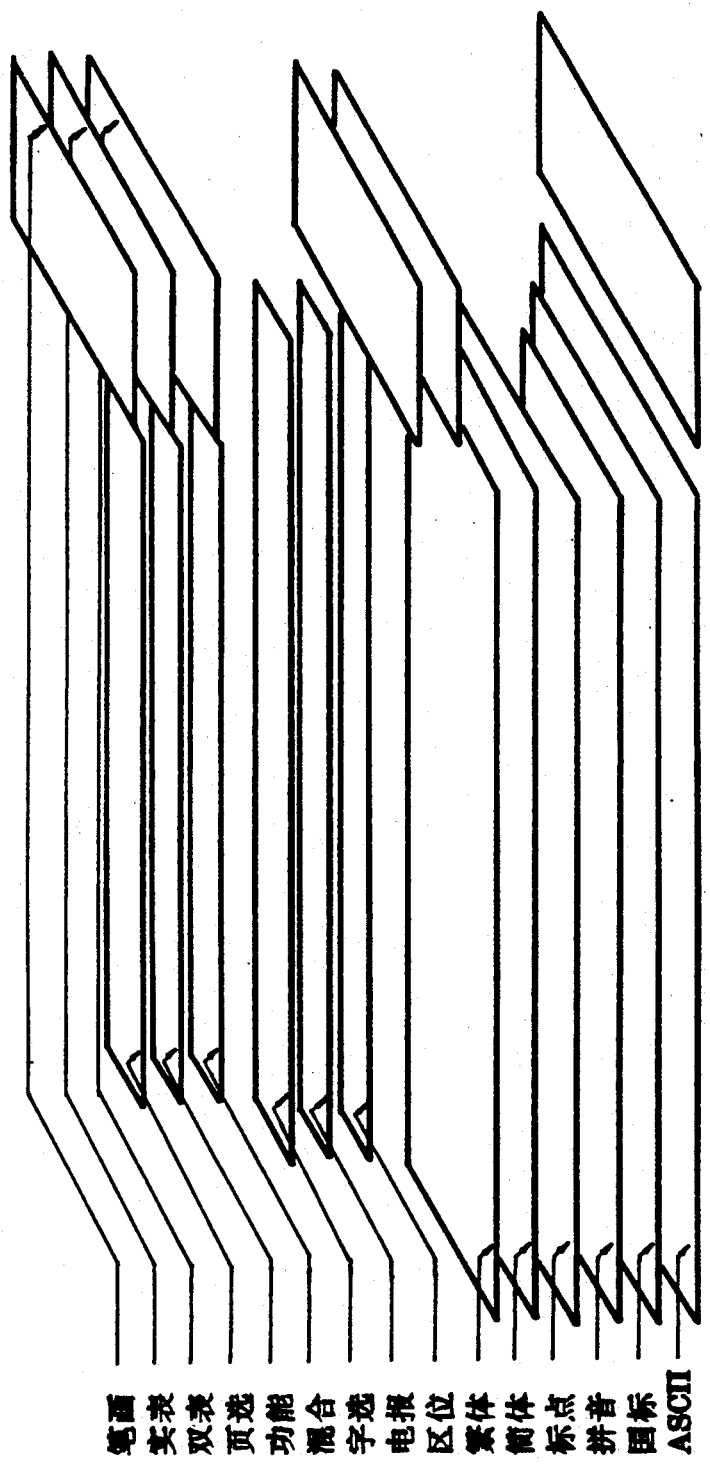
FIG. 24 is a schematic diagram of the multi-page keyboard.
Figure 25:
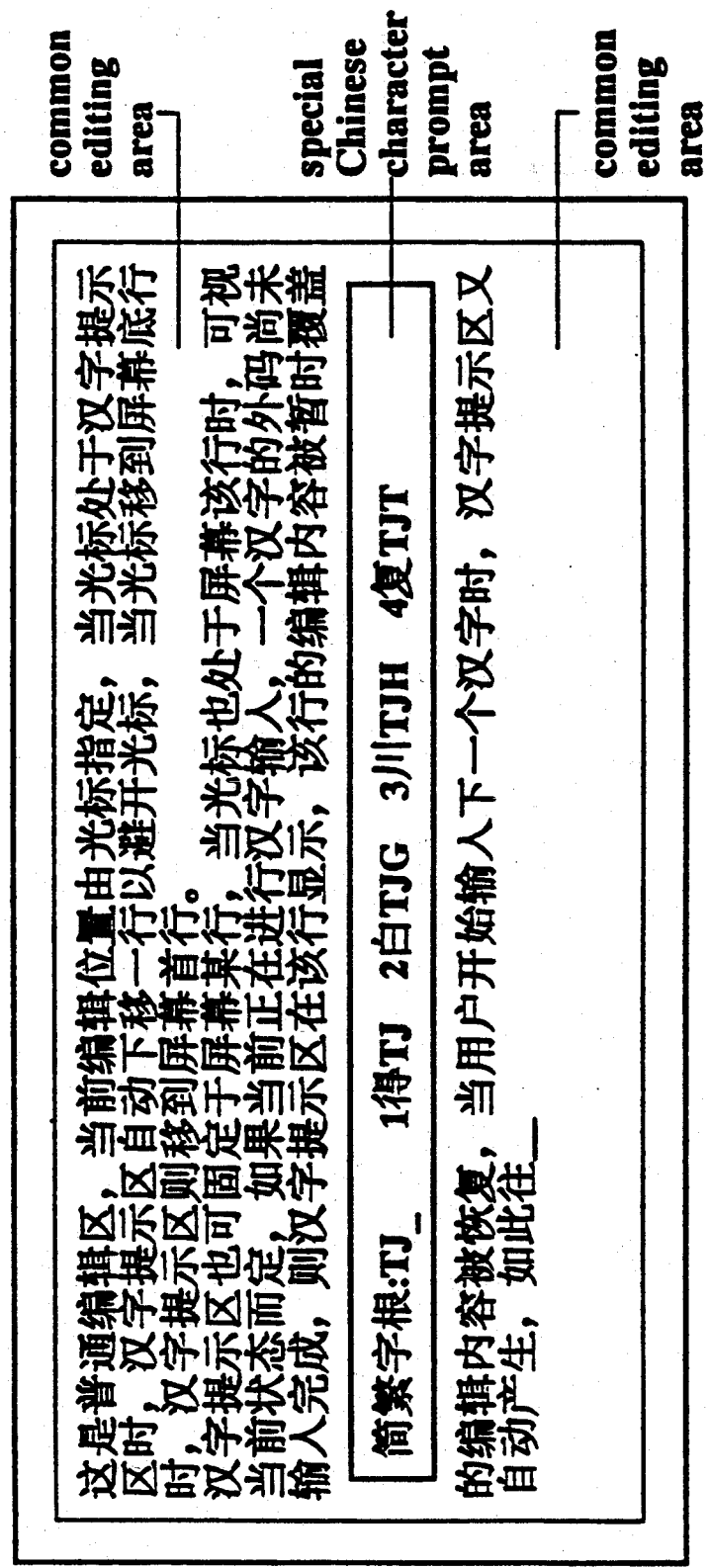
FIG. 25 is a schematic diagram of a displaying screen showing a common editing area and a Chinese character prompt area.

The multi-page keyboard of the present invention comprises the following fifteen keyboard pages (a schematic diagram is shown in FIG. 24):

1. Keyboard page for original complex form radicals (as shown in FIGS. 1 and 2).
2. Keyboard page for simplified form radicals (as shown in FIGS. 3 and 4).
3. Stroke keyboard page (as shown in FIG. 12).
4. Pinyin (phonetics) keyboard page (as shown in FIG. 15).
5. Telegraph keyboard page (as shown in FIG. 16).
6. Region-location keyboard page (as shown in FIG. 17).
7. National Standard keyboard page (as shown in FIG. 18).
8. Keyboard page for Chinese character solid line form symbols (as shown in FIG. 5). 9. Keyboard page for Chinese character double solid line form symbols (as shown in FIG. 6). 10. Keyboard page for Chinese character punctuation marks (as shown in FIG. 7). 11. Chinese character selection keyboard page (as shown in FIG. 19). 12. ASCII character keyboard page (as shown in 13. Page selection keyboard page (as shown in 14. Status selection keyboard page (as shown in 15. Combined control keyboard page (as shown in The following is a description of each keyboard page:

1. Keyboard page for original complex form radicals (as shown in FIGS. 1 and 2).

This keyboard page is distributed on the left side main keyboard of a standard keyboard. This keyboard page is designed in synthetic consideration of the criteria of frequency distribution of radical regularity and requirements of fingering etc. based on the Chinese character radical system, disassembling system and encoding system of the original complex form radical Chinese character inputting method.

2. Keyboard page for simplified form radicals (as shown in FIGS. 3 and 4).

This keyboard page is distributed on the left side main keyboard of a standard keyboard. This keyboard page is designed in synthetic consideration of the criteria of frequency distribution of radical regularity and requirements of fingering etc. based on the Chinese character radical system, disassembling system, and encoding system of the simplified form radical Chinese character inputting method.

3. Stroke keyboard page (as shown in FIG. 12).

This keyboard page is distributed on the right side small numeric keyboard of a standard keyboard. The five basic strokes are positioned on the five numeric keys "1", "2", "3", "4", and "5" respectively according to their partitions and order of arrangement in GB2320-80; "6" is used as the fuzzy key; "7" is used as the phrase introducing key; "8" is used as the identical code backward selecting key; "9" is used as the identical code forward selecting key; and "0" is used as the ending key.

4. Pinyin keyboard page (as shown in FIG. 15).

This keyboard page is distributed on the left side main keyboard. The English alphabetic keys are used as the Chinese Pinyin alphabetic keys. The two single quotation mark keys are used as identical code forward selecting key and backward selecting key. The space bar is also used as identical code forward selecting key.

5. Telegraph keyboard page (as shown in FIG. 16).

This keyboard page is distributed on the left upper numeric keys and the right side numeric keys. The two sets of numeric keys "0" through "9" on both sides are used as telegraph code input keys.

6. Region-location keyboard page (as shown in FIG. 17).

This keyboard page is distributed on the left upper numeric keys and the right side numeric keys "0" through "9" on both sides are used as region-location code input keys.

7. National Standard keyboard page (as shown in FIG. 18).

This keyboard page is distributed on the left side main keyboard of a standard keyboard. The numeric keys "0" through "9" and alphabetic keys "A", "B", "C", "D", "E", and "F" are used as National Standard code input keys.

8. Keyboard page for Chinese character solid line form symbols (as shown in FIG. 5).

This keyboard page is distributed on the right side numeric keyboard of a standard keyboard. Nine form symbols are defined on nine numeric keys "1" through "9" which form a Chinese character "田" in shape. "｜" (vertical line) is defined on the key "0"; "—" (horizontal line) is defined on the key "−" (minus); and "+" (cross) is defined on the keys "+" (plus).

9. Keyboard page for Chinese character double solid line form symbols (as shown in FIG. 6).

This keyboard page is distributed on the right side numeric keyboard of a standard keyboard. Nine double line form symbols are defined on the nine numeric keys "1" through "9" which form a Chinese character "田" in double line (hollow) shape. "‖" (double vertical line) is defined on the key "0"; "=" (double horizontal line) is defined on the key "−" (minus), and "✳" (hollow double line cross) is defined on the key "+" (plus).

10. Keyboard page for Chinese character punctuation marks (as shown in FIG. 7).

This keyboard page is distributed on the English punctuation mark keys of a standard keyboard. Some English punctuation mark keys unused in Chinese text inputting and editing are defined as Chinese character punctuation marks having similar meanings.

11. Chinese character selection keyboard page (as shown in FIG. 19).

This keyboard page is distributed on the left upper numeric keys of a standard keyboard. When identical codes are displayed in the prompting line, this keyboard page floats on the surface automatically and the initial pages defined on those numeric keys are covered temporarily.

Figure 20:
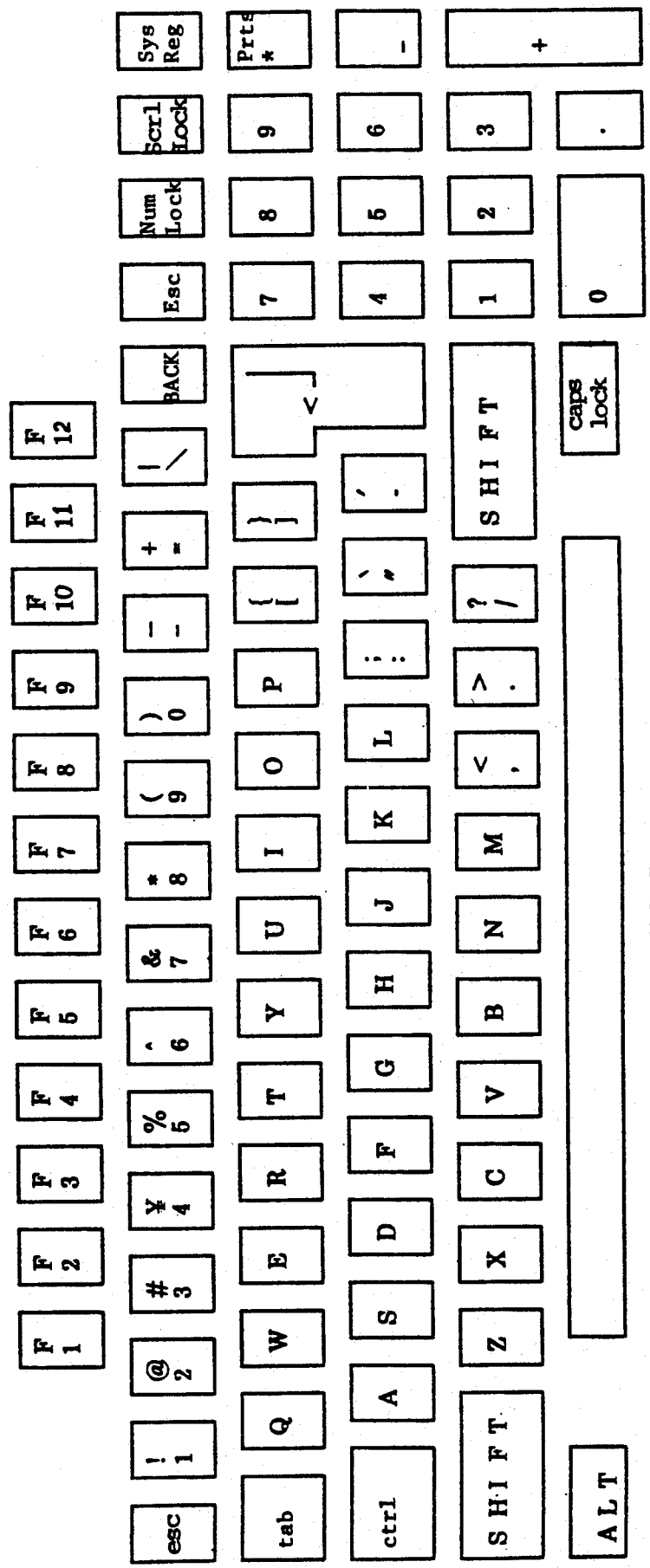
FIG. 20 is a ASCII character keyboard page.

12. ASCII character keyboard page (as shown in FIG. 20).

This keyboard page is the basic definition of a standard keyboard. When the whole keyboard is not fully covered by the pages on the surface currently, the remaining uncovered part is always the exposed part of the ASCII keyboard page.

13. Page selection keyboard page (as shown in FIG. 21).

This keyboard page is distributed on the ten function keys "F1" through "F10". When the "ALT" key is pressed, this keyboard page floats on the surface. If any keyboard page is needed to float to the surface, the corresponding keyboard page key (i.e. "F1" through "F10") on this keyboard page is pressed. The corresponding keyboard page will float on the surface until this keyboard page (page selection keyboard page) is used to select another page, but the current state of the "radical" keys is controlled by the state of the "original complex form/simplified" conversion key on the "combined control keyboard page" to determine whether the "keyboard page for unsimplified radicals" or the "keyboard page for simplified form radicals" is on the surface currently. The "form" keys require the state of the "solid line/double solid line" convention key on the "combined control keyboard page" to determine whether the "keyboard page for Chinese character solid line form symbols" or the "keyboard page for Chinese character double solid line form symbols" is on the surface currently. When the "HELP" key on this keyboard page is pressed, the definition on the current status of the "page selection keyboard page", "state selection keyboard page", and "combined control keyboard page" will be displayed on the screen. If any other keys on these three keyboard pages are pressed, the corresponding keyboard page or description of its functions will be displayed on the screen. The pressing of any of the other keys again will recover the initial contents on the screen.

14. State selection keyboard page (as shown in FIG. 22).

This keyboard page is distributed on the ten function keys "F1" through "F10". When the "CTRL" key is pressed, this keyboard page floats to the surface wherein "F1" through "F8" are the screen state selection keys, "F9" is the "instant phrase formation" state introducting key, and "F10" is the printer state setting key.

15. Combined control keyboard page (as shown in FIG. 23).

This keyboard page is distributed on the ten function keys "F1" through "F10". When the "SHIFT" key is pressed, this page floats to the surface, wherein "F1" through "F3" are the initiating keys for 6 combined inputting methods, "F4" through "F6" are conversion keys for "simplified/original complex form" state, "solid line/double solid line" state, and "Q/X" state; and "F7" through "F10" are the initiating keys for auxiliary inputting methods.

The methods of the present invention can also be used to perform Chinese character encoding, keyboard design or defining, code table sorting and editing, and character dot matrix library construction, terminals, and telex machines of all types.

We claim:

1. A Chinese character inputting system for computers or the like comprising:
   means for processing and inputting Chinese character information including a standard English keyboard on which a plurality of keyboard pages are defined in multiple levels, said keyboard pages being adjusted alternatively onto the surface of the keyboard and each taking at least a part of the keyboard, said keyboard pages including at least one character-radical keyboard page, wherein radicals of Chinese characters are selected according to conventional way of disassembling Chinese characters and are allocated on key positions of said radical keyboard page but changeable upon frequency of use of each radical and user's habit;
   means for converting the Chinese character information inputted through the keyboard into internal codes of the Chinese characters, said converting means including a plurality of Chinese character encoding methods corresponding to at least some of the keyboard pages;

means for displaying instantly Chinese characters, having a screen composed of a common editing area and a Chinese character prompt area, said prompt area being automatically generated when it is needed and eliminated thereafter, said prompt area having at least one line and being alternatively positioned on any portion of the screen without interferring with editing work of the editing area, and being distinguishable from the editing area and characters by using different colors therefor; and a set of Chinese character dot matrix libraries including at least a dot matrix library for simplified form Chinese characters and a dot matrix library for original complex form Chinese characters;

wherein said keyboard pages comprise at least a keyboard page for single solid line form-making symbols and a keyboard page for double solid line form-making symbols which are defined on nine numeral keys of the number 1 through 9 on the right side of the keyboard so as to constitute a " 田 " shape, wherein a vertical line symbol is defined on a zero key, a horizontal line symbol is defined on a minus key, and a cross line symbol is defined on a plus key.

2. The system according to claim 1, wherein said keyboard pages comprise at least a Chinese character punctuation symbol keyboard page defined on English punctuation symbol keys which are not used in Chinese text but have similar meaning.

3. The system according to claim 1, wherein the original complex form character dot matrix library is a 16×16 dot matrix library and a 24×24 dot matrix library which is formed by changing about 2,000 simplified form Chinese characters having original complex form or variation forms to their corresponding original complex form or variation form Chinese characters based upon a Chinese Character Information Exchange Basic Set formed according to the Chinese national Standard GB2313-80, and by adding other characters which are unchanged, and about 100 original complex form characters as well as certain variation form characters for storage to form a character set being digitized by 16×16 array and 24×24 array.

4. A method for inputting both simplified form and original complex form Chinese characters and phrases including a plurality of auxiliary Chinese character inputting methods, wherein each phrase includes at least two Chinese characters and each character is disassembled in conventional way into radicals including strokes, general radicals and radical groups, said strokes being continuous written lines, said general radicals composed of cross-fitted and intercircled strokes forming certain geometrical shapes, and said radical groups being groups of general radicals having same geometrical shapes; said method comprising the steps of:

a) picking up 50 to 250 radical sin consideration of conventional character side components, headings and strokes;

b) dividing said radicals into a plurality of sections according to the similarities among the radicals, each of said section being defined onto one key of a standard English keyboard;

c) selecting up to four radicals from the radicals disassembled from the character in accordance with the following rules of (i) taking first three and last radicals but omitting the fourth through the next to the last radicals when the disassembled radicals are more than four; (ii) taking all of four radicals when the disassembled radicals are four; (iii) adding the last stroke of said character after the last disassembled radicals when the disassembled radicals are three; (iv) further adding a space key thereafter when the number of th disassembled radicals is less than three;

d) striking keys on the keyboard corresponding to the selected radicals, and said method further comprising a first auxiliary Chinese character inputting method in which a pinyin/-character-phrase conversion is carried out by the following steps:

(1) setting up a basic pinyin table with a comparison between said Chinese character and its pinyin code sequence including pinyin alphabetic letters and their intonation symbols;

(2) setting up a common dynamic phrase bank;

(3) sorting out all Chinese characters having the same leading letters in their sequences as inputting alphabetic letters of the pinyin for a Chinese character from the keyboard for determining whether to send the Chinese characters sorted to the prompt area or to wait for subsequent input until an end symbol is inputted depending on a current situation is automatic or non-automatic;

(4) sending the Chinese characters sorted to the prompt area for selection if the end symbol comes or the current situation is automatic;

(5) sending out the corresponding Chinese character if a numeral key is inputted, returning to the third step if a liaison symbol is inputted, otherwise supplementing an alphabetic letter into sequence of the third step if the alphabetic letter key is inputted, so as to determine whether the supplemented sequence is the sequential leading letters of the pinyin of the Chinese character, returning to the third step if yes; otherwise (6) taking the present and subsequent keys as several leading letters of the pinyin of a next Chinese character and sorting out all Chinese characters having the same several leading letters;

(7) if the above sorted-out Chinese characters are the same as some phrases of the phrase bank set up in step 2, sorting out those phrases and returning to the third step, subsequently processing such phrases in the same way of processing a single character so that the first Chinese character in the prompt area is sent out and the Chinese characters sorted out in step 6 are displayed in the prompt area; and (8) repeating above steps to complete the conversion.

5. The method according to claim 4, wherein the Chinese characters which are themselves radicals are disassembled into subsequent radicals in the same method of disassembling a common Chinese character, while each of such radical itself is added after subsequent radicals when the subsequent radicals disassembled are less than four.

6. The method according to claim 4, further comprising the steps of:

substituting the Chinese characters having identical codes into a text in turn to check whether a meaningful Chinese phrase can be formed thereby when the text is inputted continuously and identical codes appear;

admitting implicitly a character if the meaningful phrase is formed by only one character having said identical codes;

producing otherwise a special sound to hint the operator to use a numeral key to select one of the Chinese characters having said identical codes; and admitting implicitly a preselected Chinese character thereof if subsequent Chinese characters are directly inputted, wherein the preselection of said character is made in consideration of the definition of the simplified form code, the capability of forming character and the frequency of use of each Chinese character having identical codes.

7. The method according to claim 4, further comprising a simplified/original complex (S/C) and original complex/simplified (C/S) conversion method by which the simplified form characters can be obtained from inputting original complex form characters and original complex form characters can be obtained from inputting simplified form characters, and by which a non-unique certainty problem that during the mutual conversion, several original complex form characters correspond to one simplified character or several simplified characters correspond to one original complex form character can be solved; the conversion including the steps of: selecting certain amount of phrase containing Chinese characters of non-unique S/C correspondence to constitute a special-use phrase bank; if an article of simplified form characters is converted into an article of original complex form characters, then in the case of using S/C conversion, examining character of the article to be converted one after another; converting the character which has unique S/C correspondence; directly sorting out the character which has no unique S/C correspondence from the special-sue phrase bank; examining several original complex form Chinese characters corresponding to the simplified one to find which one constitutes a phrase in a context; converting simplified form character into the original complex character if there is one, otherwise, selecting a corresponding one of the characters displayed one after another; if the original complex form character to be selected appears, pressing a return key to indicate that said character is hit; repeating the procedures so that the conversion can be completed.

8. The method according to claim 4, wherein in step a) 187 radicals are picked up and i step b) the picked up radicals are divided into 25 sections, and after step d), said method further comprising the steps of substituting a few Chinese characters having identical codes into a text in turn to check whether a meaningful Chinese phrase can be formed when the text is inputted continuously and identical codes appear; if only one character having said identical codes can constitute the meaningful phrase, admitting said character implicitly; otherwise producing a special signal sound to hint the operator so that a numeral key can be inputted to select a Chinese character thereof; if subsequent Chinese characters are directly inputted, admitting preselected Chinese character thereof implicitly, wherein the preselection of said character is made in consideration of the definition of the simplified form code, capability of forming the character and the frequency of sue of each Chinese character having said identical codes.

* * * * *